No. 608,769. Patented Aug. 9, 1898.
T. GILMER.
DEVICE FOR LOCKING OR SECURING BICYCLES.
(Application filed July 24, 1896.)
(No Model.) 3 Sheets—Sheet 1.

WITNESSES
O. C. Vinge.
J. A. Rennie

INVENTOR
Tazwell Gilmer
BY
Clark Deemer & Co.
ATTORNEYS

No. 608,769. Patented Aug. 9, 1898.
T. GILMER.
DEVICE FOR LOCKING OR SECURING BICYCLES.
(Application filed July 24, 1896.)
(No Model.) 3 Sheets—Sheet 2.
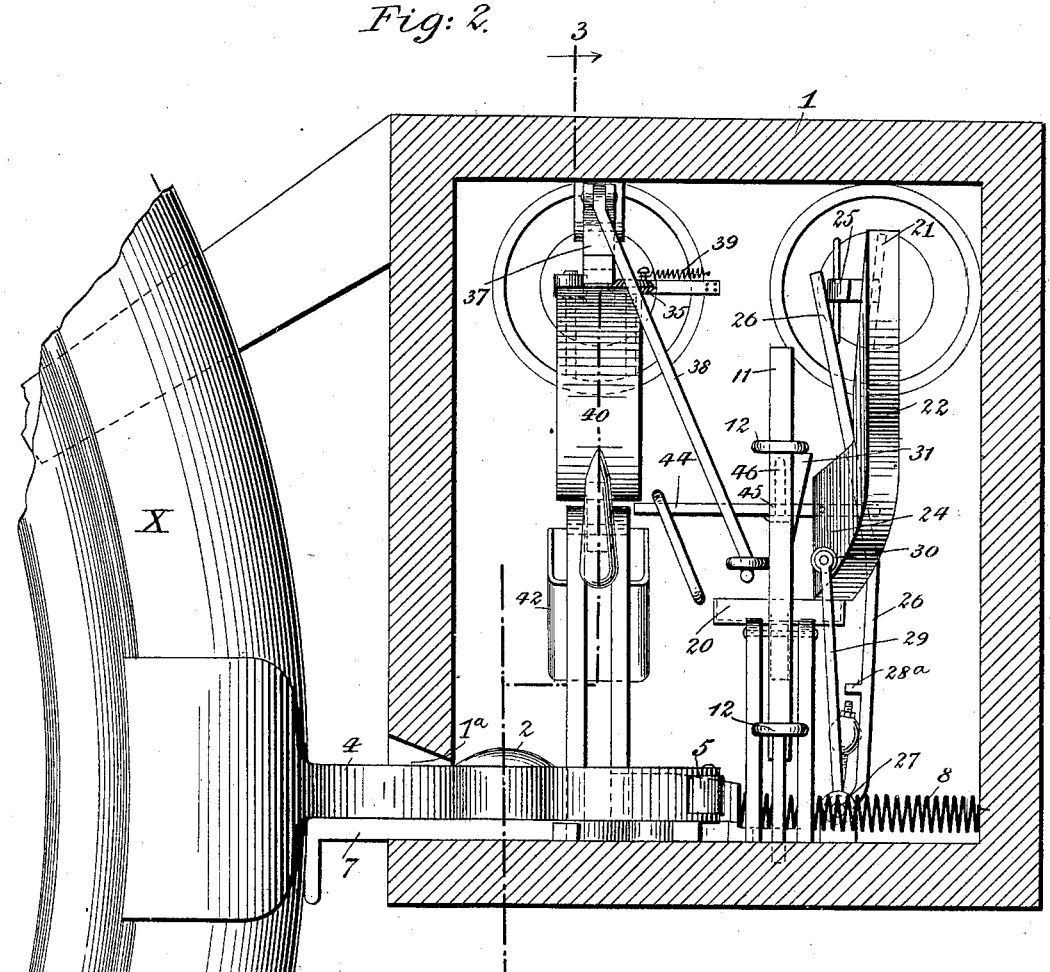
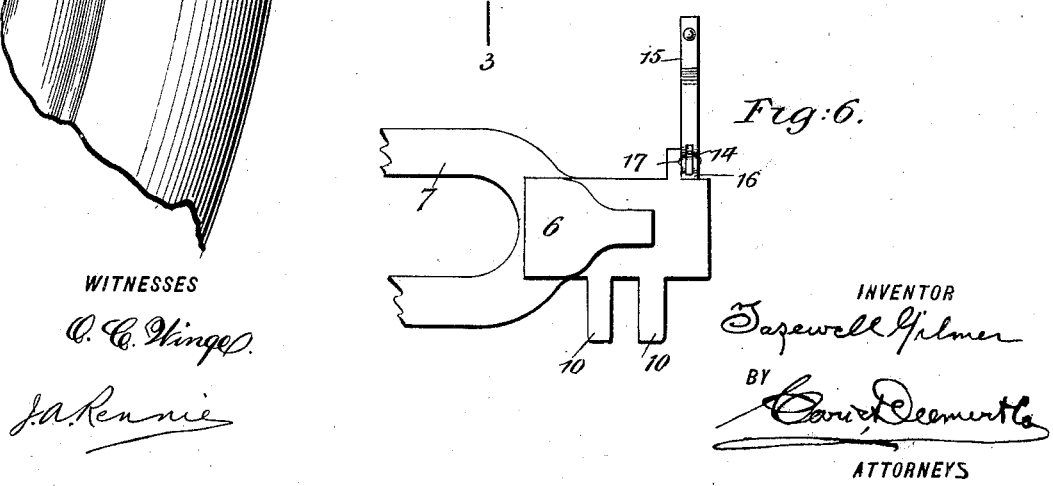
WITNESSES
INVENTOR
ATTORNEYS No. 608,769. Patented Aug. 9, 1898.
T. GILMER.
DEVICE FOR LOCKING OR SECURING BICYCLES.
(Application filed July 24, 1896.)
(No Model.) 3 Sheets—Sheet 3.
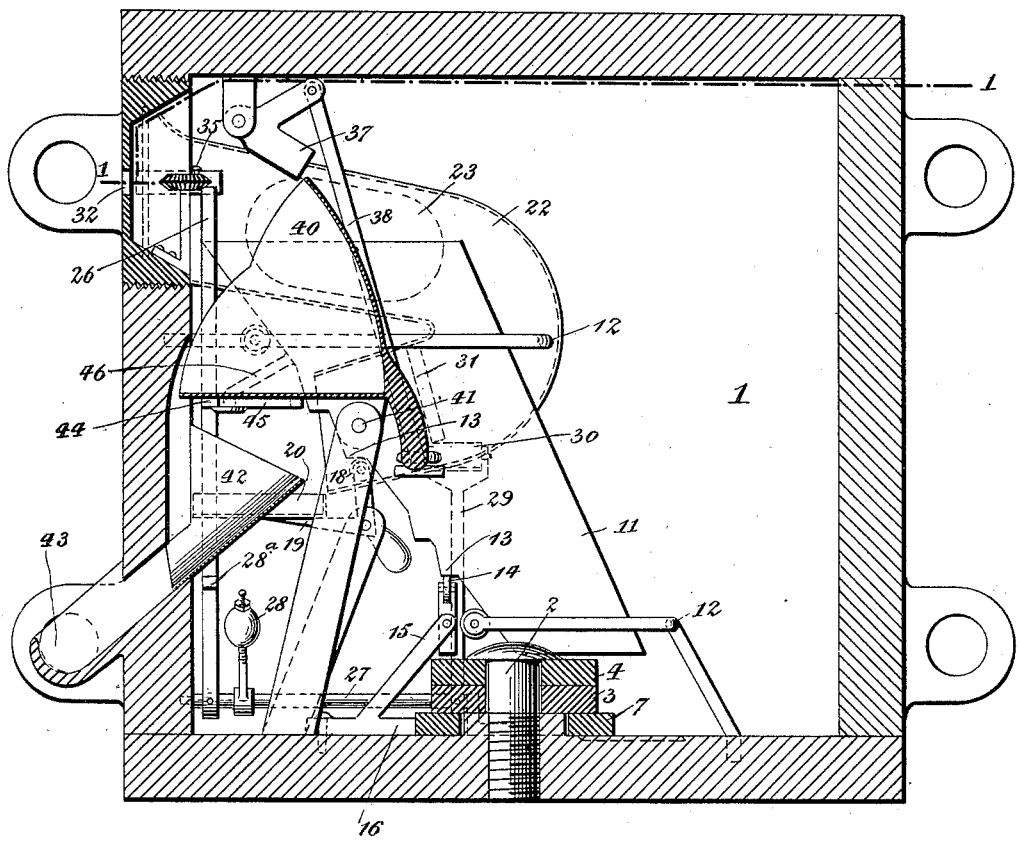
Fig: 3.
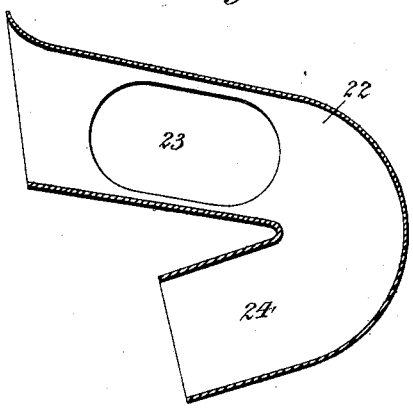
Fig: 4.
WITNESSES
O. C. Winge.
J. A. Rennie
INVENTOR
Tazewell Gilmer
BY
Carey Dement & Co.
ATTORNEYS

UNITED STATES PATENT OFFICE.

TAZEWELL GILMER, OF NEW YORK, N. Y.

DEVICE FOR LOCKING OR SECURING BICYCLES.

SPECIFICATION forming part of Letters Patent No. 608,769, dated August 9, 1898.

Application filed July 24, 1896. Serial No. 600,338. (No model.)

*To all whom it may concern:*

Be it known that I, TAZEWELL GILMER, a citizen of the United States, and a resident of New York, (Brooklyn,) county of Kings, and State of New York, have invented certain new and useful Improvements in Devices for Locking or Securing Bicycles, of which the following is a specification, reference being had to the accompanying drawings, forming a part thereof, in which similar letters and numerals of reference indicate corresponding parts.

This invention relates to a novel device for locking or securing bicycles and other similar vehicles against the interference of parties other than those to whom the bicycle or vehicle belongs; and the object of the invention is to provide a device of this character of a simple and inexpensive construction which shall be strong and compact, so as to be adapted to hold the bicycle securely against removal, and which shall be adapted to be actuated by the insertion of a coin.

The invention also consists in certain novel features of construction, combination, and arrangement of the various parts of the improved device whereby certain important advantages are attained and the mechanism is made simpler and cheaper and otherwise better adapted for use, all as will be hereinafter set forth.

Figure 1:
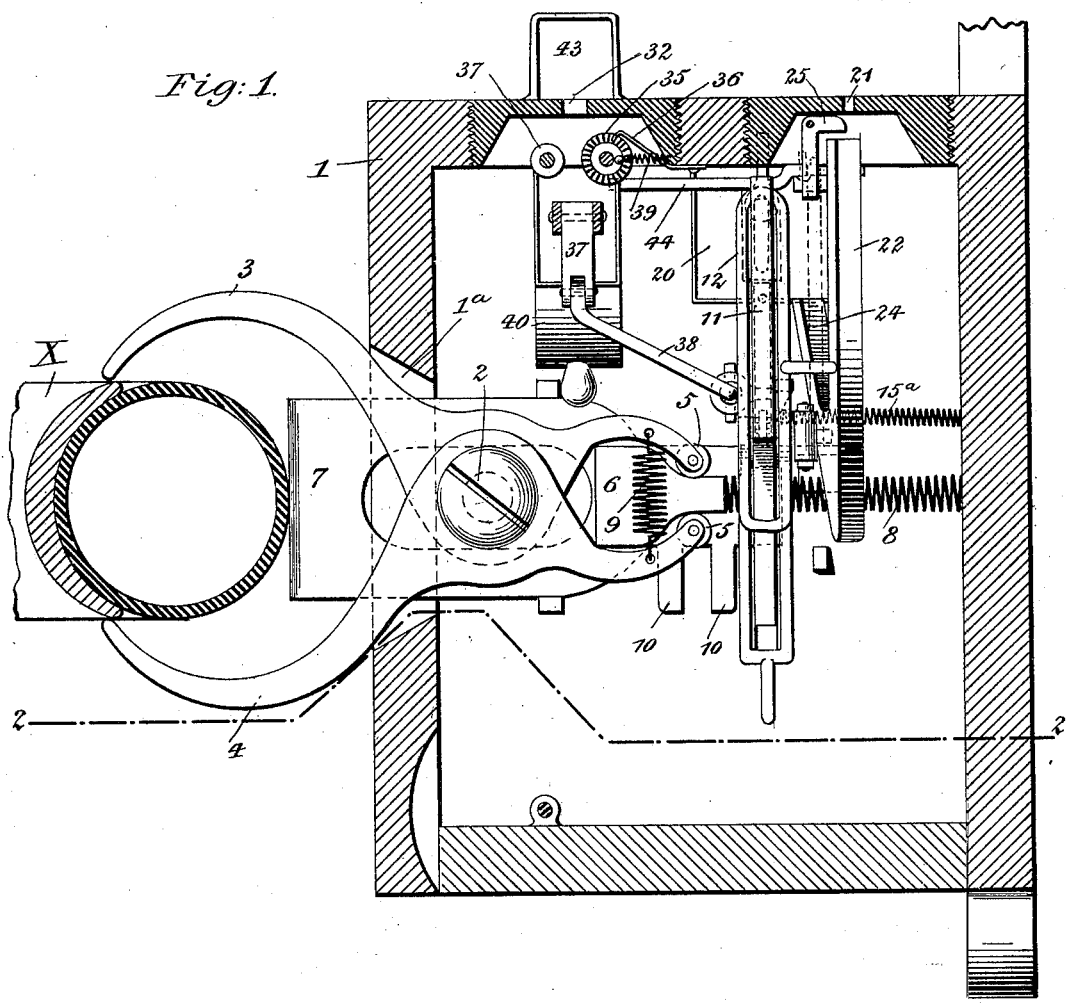
Figure 5:
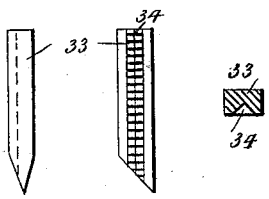

In the accompanying drawings, forming part of this specification, Figure 1 is a sectional plan view taken on the line 1 1 of Fig. 2, showing my invention in position ready to receive and lock the bicycle or other vehicle. Fig. 2 is a sectional elevation taken on the line 2 2 of Fig. 1. Fig. 3 is a sectional elevation taken on the line 3 3 of Fig. 2. Fig. 4 is a detail view of the coin-chute. Fig. 5 shows in detail the releasing device used to unlock the bicycle, and Fig. 6 is a detail view of a slide-plate and tumbler used in connection with my invention.

In the views, 1 indicates the casing wherein the operative parts of the device are arranged, this being, as shown, of a rectangular form and being provided at one side with an opening $1^a$, through which project arms 3 and 4, curved, as clearly shown in Fig. 1, so as to be adapted to take over the rim or equivalent part of the bicycle to be locked, said arms being pivoted together, as indicated at 2 in Fig. 1, inside the box and having their inner ends provided with rollers and adapted to engage the opposite inclined surfaces of the cam or wedge-like projection 6 on one side of a slide-plate 7, slotted so as to be guided on the pivot-pin of the jaws 3 and 4 and having its end projecting through the opening $1^a$ in the casing in the position to be engaged by the tire of the bicycle-wheel X when the same is inserted between the jaws 3 and 4.

The slide 7 is normally held and pressed outward by means of a spring 8, arranged behind it, and the inner ends of the jaws 3 and 4 are normally drawn together by means of a spring 9, as shown in Fig. 1, so that their outer ends are normally held pressed apart to receive the bicycle to be locked.

The inner end of the slide-plate 7 is provided at one side with projecting lugs 10, spaced apart to form between them a locking-notch adapted to receive the lower end of a bolt 11, mounted in guides 12 inside the casing 1. The bolt 11 stands and moves in an inclined position, as indicated in Fig. 3, and its lower inclined side or end is provided with a series of projections 13, the lower projection 13 being arranged to rest on a roller 14, carried on the upper part of a tumbler 15, pivoted on one side of the casing 1 and having an arm 16, to be engaged by a lug or finger 17, formed on the slide-plate 7, as indicated in Fig. 6. By this construction it will be seen that when the slide-plate has been pressed in by the insertion of a bicycle-wheel the tumbler 15 will be moved pivotally, so as to withdraw the roller 14 from under the lower projection 13 on the bolt 11. A spring $15^a$ serves to return the tumbler to its normal position when the slide 7 is withdrawn.

The upper projection 13 on the bolt 11 rests upon a roller 18, carried on an elbow-lever 19, which supports the coin-basket 20, which is arranged, as will be hereinafter explained, to receive the coins inserted in the casing, and it will be seen that when a coin has been inserted the tray, which is normally arranged to stand as shown in Fig. 3, will be tilted so as to withdraw the roller 18 from beneath the upper projection 13 on the bolt 11, whereupon said bolt will be permitted to drop and engage its lower end in the locking-notch formed between the lugs 10 on the slide-plate 7. In this way it will be seen that the slide-plate 7 may be freely operated and pushed in without the insertion of a coin, the bolt 11 being held against dropping by means of the roller 18, which engages under the upper projection on the bolt, and consequently when pressure is removed from the slide-plate it will be at once pushed out by means of its spring 8.

21 indicates the coin-slot of the casing, said slot being arranged slightly inclined to the perpendicular, as shown in dotted lines, Fig. 2, and 22 indicates the coin-chute shown in detail in Fig. 4, said chute being inclined similarly to the coin-slot and being formed in its lower inclined side or base with an opening 23, so that in case a coin of a smaller size than that for which the mechanism is designed is inserted through the slot such coin will fall through the opening 23 into the interior of the casing without operating the bolt 11. The lower end 24 of the coin-chute is bent in such a way as to deliver the coins therefrom to the coin tray or basket 20.

In order to prevent the coin from falling from the coin tray or basket 20 and permitting the roller 18 to be again engaged under the upper projection 13 on the bolt 11 before the slide-plate 7 has been pushed in, I provide a dog 25, pivoted adjacent to the coin-slot 21 and having its end arranged to be engaged by the coin inserted thereat, so that the dog will be swung pivotally. The other end of the dog engages the bent end of an arm 26, projecting from a rock-shaft 27, mounted in the lower part of the casing and provided with a counterpoise 28, as shown in the drawings. In this way it will be seen that when a coin is inserted the arm 26 will be moved so as to bring a lug 28$^a$, formed upon it, into position to be engaged by the coin-tray 20 when the same descends, so as to stop the coin-tray against movement while the coin is held therein.

On the rock-shaft 27 is formed another arm 29, having a roller 30, arranged when the rock-shaft is turned to be moved into position to be engaged by a cam 31 on one side of the bolt 11, so that as the bolt descends when the bicycle is inserted between the jaws 3 and 4 the engagement of the cam 31 with the roller 30 will serve to turn the rock-shaft in the opposite direction and return the arm 26 and dog 25 to their normal positions, as shown in Figs. 1 and 2.

In the casing 1 is formed a keyhole or opening 32, adapted for the insertion of a key 33, (shown in Fig. 5,) wherewith the device may be operated to lift the bolt 11 and unlock the parts, so as to release the bicycle. The key 33 is formed in one side with a series of teeth or notches 34 to engage the teeth of a bevel-faced spur-wheel 35, mounted to turn in the casing and held against backward movement by means of a spring-pawl 36, as shown in Fig. 1.

A roller 37 is loosely mounted opposite the wheel 35 and serves to hold the key in engagement with said wheel. When the key is inserted through the keyhole 32, its extremity will engage a dog 37, pivoted in the casing, and lift the same. The dog 37 is connected by means of a link 38 with the bolt 11, so that when the dog 37 is lifted by the insertion of the key the bolt 11 will be also lifted and its lower end withdrawn from engagement with the slide-plate 7, so as to release the same and permit the spring 8 to force the same out, whereby the jaws 3 and 4 will be opened and the bicycle released.

A spring 39, inside the casing, is connected eccentrically with the wheel 35 in such a way that when the wheel is turned half-way round by the insertion of the key said spring on passing the center line through the wheel and its point of connection with the casing will impart a quick movement to said wheel, so as to draw the key inside the casing and permit the key to fall into a holder 40, pivotally mounted at 41 in the casing and arranged to discharge the key when swung pivotally into the upper end of a key-chute 42, communicating with a receptacle 43 outside the casing.

The key-holder 40 is arranged to stand normally in position to receive the key, as indicated in Fig. 3; but when the key is in place therein the holder is overbalanced and will tend to drop and discharge the key into the chute 42. To prevent the holder from dropping when the key is inserted in the casing, I provide a lever 44, pivoted in the casing and having a slotted arm extending at right angles from it, the slot in said arm being engaged by a finger 46, carried by the bolt 11. In this way it will be seen that when the bolt falls the lever 44 will be moved pivotally, so that its end will be withdrawn from under the holder 40, so the same will be permitted to swing down and discharge the key into the chute 42. When the bolt is again raised by the insertion of the key, as above explained, the connection between the lever 44 and said bolt will serve to again raise the lever in position to prevent the holder from falling, the holder being also returned to its normal position (shown in Fig. 3) by gravity.

From the above description it will be seen the invention is of an extremely simple and inexpensive nature and is especially well adapted for the purposes for which it is designed, and it will also be seen that the invention is susceptible of considerable modification without material departure from its principles and spirit, and for this reason I do not wish to be understood as limiting myself to the precise form and arrangement of parts herein set forth.

Having thus described my invention, what I claim as new, and desire to secure by Letters Patent, is—

1. A device for holding bicycles and the like, comprising pivoted movable parts to engage the bicycle, a slide to engage said parts, a bolt to engage and lock said slide, and coin-controlled means for holding said bolt, substantially as shown and described.

2. A device for holding bicycles and the like, comprising parts to engage the bicycle, said parts being pivotally connected inside the casing, a slide controlling said parts, a bolt to hold said slide and means to lock the bolt, substantially as shown and described.

3. A device for holding bicycles and the like, comprising parts to engage the bicycle, a slide-plate controlling said parts, a bolt controlled by the slide-plate and arranged to hold the same against movement, and coin-controlled means to hold the bolt, substantially as shown and described.

4. A device for holding bicycles and the like, comprising parts to engage the bicycle, coin-controlled means for locking the parts, a holder for the key, and means actuated by the parts when locked to operate the key-holder to discharge the key, substantially as shown and described.

5. A device for holding bicycles and the like, comprising a casing, jaws to engage the bicycle, a slide-plate operatively connected to the jaws, a bolt to engage the slide-plate, means actuated by the slide-plate to hold the bolt against operation, coin-controlled means to hold the bolt against operation, a spur-wheel to engage a key having notches therein, a spring to actuate the spur-wheel, a holder to receive the key, a discharge-chute, and means to prevent the discharge of the key from its holder while it is raised, substantially as shown and described.

In testimony that I claim the foregoing as my invention I have signed my name, in presence of two witnesses, this 16th day of July, 1896.

TAZEWELL GILMER.

Witnesses:
JOS. H. HORTON,
JOHN A. WAGNER.